April 22, 1958     J. SWISS ET AL     2,831,783
TRACING SHEET
Filed Jan. 25, 1954
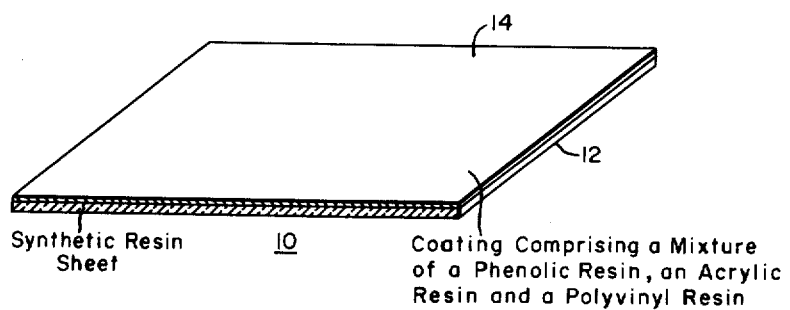
Synthetic Resin Sheet    10    Coating Comprising a Mixture of a Phenolic Resin, an Acrylic Resin and a Polyvinyl Resin
WITNESSES
Edwin E. Basiler
Leon M. Garman
INVENTORS
Jack Swiss and
Irving N. Elbling
BY
Frederick Shoop
ATTORNEY

United States Patent Office 2,831,783
Patented Apr. 22, 1958

2,831,783
TRACING SHEET

Jack Swiss, Murrysville, and Irving N. Elbling, Pittsburgh, Pa., assignors to Westinghouse Electric Corporation, East Pittsburgh, Pa., a corporation of Pennsylvania Application January 25, 1954, Serial No. 406,044

10 Claims. (Cl. 117—138.8)

This invention relates to a tracing sheet material, comprising a coated translucent synthetic resin film capable of being used for making both ink and pencil tracings which can be readily reproduced.

At the present time, in the making of tracings of drawings which are to be reproduced, it is usual to employ a translucent sheet of paper or treated cloth which is placed over the drawing, and the drawing copied in ink or in pencil upon this translucent tracing sheet. A number of disadvantages well known to draftsmen are encountered in using such previously known tracing materials. Thus, tracing paper is easily torn and becomes "dog-eared" on being handled a number of times. Furthermore, on being stored for several years, the tracing paper becomes increasingly embrittled so that it readily will crack or tear unless handled with extreme care. Tracing cloth is much stronger than tracing paper, but it likewise becomes brittle with age. In addition, tracing cloth is relatively expensive.

In many instances, the storage of tracing paper and tracing cloth is a problem, particularly in drafting rooms where large quantities of drawings are made regularly. The storage and handling of tracing paper, for example, constitutes a great expense, and if the tracings tear or otherwise deteriorate, the expense of handling is greatly increased. Furthermore, both tracing paper and tracing cloth are of a substantial thickness of from 3 to 5 mils or even more (a mil being 0.001 inch). Both tracing cloth and tracing paper are moisture sensitive in that they change in dimensions with relative humidity, and this constitutes another disadvantage attendant upon their use.

The object of the present invention is to provide a tracing sheet comprising a thin film of transparent or translucent synthetic resin provided with a surface coating to impart thereto the ability to take ink and pencil markings satisfactorily and to enable ready erasure of such markings.

A further object of the invention is to provide a translucent tracing sheet comprising a transparent film of a synthetic resin with great resistance to tearing and cracking on being handled and flexed, the film being of a thickness of 1 mil or less and provided with a thin surface coating to impart to the film the ability to take ink and pencil markings readily and to enable erasure of such markings.

Other objects of the invention will, in part, be obvious, and will, in part, appear hereinafter.

For a better understanding of the nature and objects of the invention, reference should be had to the following detailed description and drawing in which the single figure is a view in perspective partly in section of a sheet of the material of the present invention.

We have discovered that an outstanding translucent sheet suitable for use as a tracing sheet may be prepared from thin, doubly oriented transparent films of certain synthetic resins. These films have great tear strength and a high flex life of at least 10,000 flex cycles. Examples of suitable transparent resinous films are nylon, polyethylene terephthalate and polyethylene. These films may be obtained in thicknesses of as low as 0.25 mil up to 2 mils and more. It has been found that films of a thickness of 1 mil and less are unusually well adapted for tracing purposes and will ordinarily be preferred. In exceptional cases a somewhat thicker film sheet may be employed up to thicknesses of 5 or even as much as 10 mils. Where large quantities of tracings are to be made and stored, films of a thickness of 1 mil and less will be preferred inasmuch as the number of drawings that may be stored is directly proportional to the thickness of the films. The polyethylene terephthalate may be prepared as set forth in U. S. Patent 2,497,376, wherein the films are doubly oriented, namely in both the lateral and longitudinal direction of the film sheet.

In order to render the films suitable to take ink and pencil markings, it is necessary that the surfaces be treated to apply to at least one side of the film, coatings comprising certain synthetic resins. In accordance with this invention, we have found that the transparent films should be provided with a coating of a thickness of approximately 0.1 to 0.6 mil, such coating comprising a mixture of synthetic resins. It has been found that the coatings must comprise a mixture of heat hardenable phenolic resin and either polyvinyl acetate or partially hydrolyzed polyvinyl acetate. These resins may be admixed in proportions to provide from 12% to 60% by weight of the phenolic resin, the balance being the polyvinyl acetate resin. However, these two resins alone are not adequate in providing optimum ability to take pencil and ink marks, as well as imparting good erasability. It is necessary to include therein either a synthetic elastomeric acrylic copolymer resin or finely divided inorganic solids, or both. At least 10 parts of the acrylic copolymer resin must be present per 100 parts of the phenolic-polyvinyl acetate, the upper limit being 65 parts per 100 parts. Similar proportions of the finely divided solids must be present. If both the acrylic copolymer and solids are used, there must be a total of from 10 to 65 parts of the combined acrylic copolymer and solids present per 100 parts of combined phenol and polyvinyl acetate. The finely divided inorganic solids are preferably white, or substantially white, solid materials. Examples of such finely divided solid materials are silica, kaolin, titanium dioxide, calcium carbonate and magnesium carbonate. It will be appreciated that mixtures of two or more solid materials may be employed. The fineness should be such as to pass through a 325 mesh sieve—average particle size being less than 44 microns.

Good coating compositions have been produced by employing as the elastomeric acrylic copolymer resin, the copolymer reaction product of butadiene and acrylonitrile, or an unsaturated aliphatic chloride, e. g. β-chloroethyl vinyl ether, and ethyl acrylate. A portion of these elastomeric acrylic resin copolymers appears to be a desirable constituent of the coatings for the purpose of this invention.

The other necessary components of the coatings are a phenolic resin and a resin selected from at least one of the group of polyvinyl acetate and partially hydrolyzed polyvinyl acetate. Polyvinyl acetate wherein approximately 10% to 35% of the acetate groups have been hydrolyzed has given good results. The polyvinyl acetate may include a small portion of butyrate, formaldehyde, or other radical present, either in the chain, or as an admixture.

The heat hardenable phenolic resins employed in the practice of the invention constitute the reaction products of either a monohydric or a polyhydric phenol, or mixtures thereof, with an aldehyde. Thus, the compositions may comprise the reaction product of 1 mol of an aldehyde such as formaldehyde and from 0.8 to 2 mols of a phenol such as hydroxy benzene, cresol, and xylenol, and a mixture of bis-phenol with a monohydric phenol such as 10 parts of 4,4'-dihydroxy diphenyl propane and 90 parts of cresol. The phenolic varnishes may be modified with small amounts of drying oils such as tung oil. Furthermore, the phenolic varnishes may comprise small amounts of rosin, and the like. Referring to the single figure of the drawing, there is illustrated a tracing sheet 10 prepared in accordance with the invention. The sheet 10 comprises a film or sheet 12 of a synthetic resin such as nylon film or polyethylene terephthalic film. The upper surface of the sheet 12 is provided with a coating 14 comprising a mixture of the phenolic resin, an acrylic resin and a polyvinyl resin, with or without finely divided fillers as set forth herein. The following examples are illustrative of the practice of the invention.

*Example I*

The following were admixed: 50 parts by weight of 15% hydrolyzed polyvinyl acetate (30% solution in methyl acetate); 25 parts by weight of an acrylonitrile (15 parts)—butadiene (85 parts) copolymer (15% solids solution in methyl ethyl ketone); and, 25 parts by weight of a partially reacted phenol-formaldehyde resin (alkali catalyzed equimolar reaction product of cresol and aqueous formaldehyde—50% solution in xylol). The above components were thoroughly admixed and further diluted with methylethyl ketone solvent to provide a 5% resin solids solution. A thin coating of the solution was applied to 1 mil thick, doubly oriented, polyethylene terephthalate film. The treated film was dried and then passed through an oven at a temperature of 100° C. for a few minutes. The dried coating had a thickness of about 0.3 mil.

The dried film was then employed in making both ink and pencil tracings from drawings. When tested by draftsmen, they reported that the tracing film took both pencil and ink smoothly. Erasures were easily made. The erased areas could be readily re-inked and re-penciled. The resulting tracing sheets were used to produce prints in commercial duplicating machines. Highly satisfactory prints were produced.

Nylon film was similarly treated with the coating solution of this Example I.

*Example II*

A coating composition was prepared as in Example I, with the further addition of finely divided silica having a particle size of an average of 2 to 4 microns, in the proportions of 12 parts silica per 100 parts of the resin solids in the composition. After thorough admixture by ball milling, a coating of the composition was applied to doubly oriented films of both polyethylene terephthalate and nylon as in Example I. Each of these films when dried were found to have excellent surfaces for taking ink and pencil markings. The films were tested for erasure and found to be excellent. Prints were made in commercial type machines from the resulting tracings and were found to be satisfactory in every respect.

*Example III*

The following were admixed: 12 parts by weight of a polyethylacrylate copolymerized with 5% β-chloroethyl vinyl ether, 12 parts by weight of phenol formaldehyde resin and 76 parts by weight of 15% hydrolyzed polyvinyl acetate. A 5% solution of this composition was prepared using methyl ethyl ketone as a solvent. The composition was applied to 0.5 and 1 mil thick, doubly oriented films of polyethylene terephthalate. The coatings were of a thickness of 0.0002 inch. After drying, the films with these coatings were found to have good ability to take ink and pencil markings and to erase readily. Satisfactory prints were made therefrom on commercial duplicating machines.

*Example IV*

A 5% solution in methyl ethyl ketone was prepared by dissolving in the ketone a mixture comprising 40 parts by weight of polyethylacrylate, 40 parts by weight of phenolic resin and 20 parts by weight of polyvinyl acetate. Doubly oriented films of polyethylene terephthalate, nylon, and polyethylene could be coated with the composition. After drying, the coated films may be inked and penciled satisfactorily as well as being erased.

The coatings of Examples III and IV are modified by adding thereto 10% by weight of silica of an average particle fineness of less than 10 microns. Upon application of these coatings to the doubly oriented synthetic resin films and drying, excellent tracing sheets are obtained.

*Example V*

The following in parts by weight were admixed and balled for 24 hours:

| | |
|---|---|
| Silica (1 micron, average particle size) | 15 |
| 15% hydrolyzed polyvinyl acetate (28% solids in methyl acetate) | 321 |
| Phenol resin (50% in xylol) (BR–10282) | 60 |
| Acetone | 200 |

The ball milled mixture was then further diluted with acetone to a 5% solids composition and coatings applied to both polyethylene terephthalate and nylon sheets of 1 mil thickness. When dried in an oven at 100° C., the applied coatings were approximately ¼ mil in thickness. Clear pencil and ink markings were readily made on the coated sheets. These markings were readily erased without impairing the ability of the sheet to take additional markings. The sheet of this Example V was of optimum characteristics.

*Example VI*

The following in parts by weight were admixed and ball milled for 24 hours:

| | |
|---|---|
| Mica—passing through 325 mesh sieve | 25 |
| 15% hydrolyzed polyvinyl acetate (28% solids in methyl acetate) | 268 |
| Phenolic resin (50% in xylol) (BR–9400) | 150 |
| Acetone | 200 |

When diluted further with acetone to 4% solids, it was applied to transparent 1 mil thick sheets of polyethylene terephthalate and baked in an oven to produce a dry coating of a thickness of approximately 0.2 mil. The coated sheets were readily marked with ink and pencil, and such markings could be erased and re-applied successfully.

Tracing sheets prepared from one mil and half mil films in accordance with this invention are from one half to one third the thickness of presently available tracing paper and tracing cloth. The resinous tracing sheets of this invention are highly resistant to humidity and are not affected appreciably by being exposed either to extremely dry or extremely damp atmospheres. Two to three times as many of the tracing sheets of this invention may be placed in a given storage cabinet as compared to the amount of tracings that could be stored if such tracings were made of paper or commercially available tracing cloth.

It will be understood that the above description is illustrative and not limiting.

We claim as our invention:

1. A translucent sheet suitable for use as a tracing sheet comprising a thin, doubly oriented, transparent film of a synthetic resin, and a thin surface coating on the film to impart to the film the ability to take ink and pencil marks satisfactorily and to enable ready erasure of such marks, the surface coating comprising essentially a cured resinous composition of from 10 to 65 parts by weight of an elastomeric acrylic copolymer resin, from 40 parts to 88 parts by weight of at least one resin selected from the group consisting of polyvinyl acetate and partially hydrolyzed polyvinyl acetate, and 60 to 12 parts by weight of a heat hardenable phenolic resin, said phenolic resin comprising the alkali catalyzed reaction product of 1 mol of an aldehyde and from 0.8 to 2 mols of a phenol, and the surface coating also comprising finely divided inorganic solids of a fineness to pass through a 325 mesh sieve, in an amount to provide not over 65 parts by weight of both the inorganic solids and acrylic copolymer resin in the coating.

2. The translucent sheet of claim 1 wherein the film comprises polyethylene terephthalate resin.

3. The translucent sheet of claim 1 wherein the film comprises nylon resin.

4. The translucent sheet of claim 1 wherein the surface coating comprises a mixture of 25% phenolic resin, 25% by weight of partially hydrolyzed polyvinyl acetate and 50% by weight of an acrylonitrile-butadiene rubbery resin.

5. The translucent sheet of claim 1 wherein the transparent film has a thickness of not over 0.002 inch.

6. A translucent sheet suitable for use as a tracing sheet comprising a doubly oriented film of polyethylene terephthalate resin, the film not exceeding 0.002 inch in thickness, and a cured resinous coating of a thickness not exceeding 0.001 inch applied to the surface of the film, the coating comprising essentially from 12% to 60% by weight of heat hardenable phenolic resin, said phenolic resin comprising the alkali catalyzed reaction product of 1 mole of an aldehyde and from 0.8 to 2 moles of a phenol, and from 40% to 88% by weight of one resin from the group consisting of polyvinyl acetate and partially hydrolyzed polyvinyl acetate, and from 10 to 65 parts by weight of inorganic solids below 325 mesh fineness, per each 100 parts by weight of the resins.

7. The translucent sheet of claim 6 wherein the coating comprises 75 parts by weight of from 10 to 30% hydrolyzed polyvinyl acetate, 25 parts by weight of phenolformaldehyde and about 12 parts by weight of a finely divided inorganic solid of below 325 mesh fineness, the coating being from 0.1 to 0.6 mil in thickness.

8. The translucent sheet of claim 6, wherein the resinous coating comprises an elastomeric acrylic copolymer resin in an amount to provide a total of not over 65 parts of both the inorganic solids and the acrylic copolymer resin.

9. The translucent sheet of claim 8 wherein the elastomeric acrylic resin comprises an ethyl acrylate copolymer.

10. The translucent sheet of claim 8 wherein the elastomeric acrylic resin comprises a copolymer of acrylonitrile and butadiene.

References Cited in the file of this patent

UNITED STATES PATENTS

| | | |
|---|---|---|
| 1,934,824 | Schwalbe | Nov. 14, 1933 |
| 2,312,623 | Brooks et al. | Mar. 2, 1943 |
| 2,433,062 | Pfeffer et al. | Dec. 23, 1947 |
| 2,497,376 | Swallow et al. | Feb. 14, 1950 |
| 2,536,657 | Reese | Jan. 2, 1951 |
| 2,584,722 | London | Feb. 5, 1952 |
| 2,678,285 | Browning | May 11, 1954 |